US011488479B2

(12) United States Patent
Stent (10) Patent No.: US 11,488,479 B2
(45) Date of Patent: Nov. 1, 2022

(54) METHODS AND SYSTEMS FOR GENERATING TARGETED WARNINGS

(71) Applicant: TOYOTA RESEARCH INSTITUTE, INC., Los Altos, CA (US)

(72) Inventor: Simon A. I. Stent, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/117,397

(22) Filed: Dec. 10, 2020

(65) Prior Publication Data
US 2022/0189308 A1 Jun. 16, 2022

(51) Int. Cl.
| | |
|---|---|
| *H04N 5/44* | (2011.01) |
| *G08G 1/16* | (2006.01) |
| *B60Q 5/00* | (2006.01) |
| *B60Q 1/46* | (2006.01) |
| *B60Q 1/04* | (2006.01) |
| *G06V 20/58* | (2022.01) |
| *G06V 40/18* | (2022.01) |
| *G06V 40/10* | (2022.01) |

(52) U.S. Cl.
CPC .............. *G08G 1/166* (2013.01); *B60Q 1/04* (2013.01); *B60Q 1/46* (2013.01); *B60Q 5/006* (2013.01); *G06V 20/58* (2022.01); *G06V 40/103* (2022.01); *G06V 40/18* (2022.01)

(58) Field of Classification Search
CPC . G08G 1/166; B60Q 1/04; B60Q 1/46; B60Q 5/006; G06K 9/00369; G06K 9/00597; G06K 9/00805
See application file for complete search history.

(56) References Cited

U.S. PATENT DOCUMENTS

| | | | |
|---|---|---|---|
| 5,801,667 A | * 9/1998 | Shimizu | H04N 7/183 340/435 |
| 7,106,180 B1 | * 9/2006 | Pompei | A01M 29/18 340/384.7 |
| 8,514,100 B2 | 8/2013 | Yamashita | |
| 10,082,796 B2 | 9/2018 | Perez et al. | |

(Continued)

FOREIGN PATENT DOCUMENTS

| | | |
|---|---|---|
| JP | 2009295184 A | 12/2009 |
| JP | 2014059841 A | 4/2014 |

OTHER PUBLICATIONS

Amir Rasouli, et al.; "Autonomous Vehicles That Interact With Pedestrians: A Survey of Theory and Practice"; https://arxiv.org/pdf/1805.11773.pdf; May 30, 2018; 18 pgs.

*Primary Examiner* — Munear T Akki
(74) *Attorney, Agent, or Firm* — Dinsmore & Shohl LLP (57) ABSTRACT

A method and system for generating and outputting a targeting warning in association with a road agent is provided. The method includes detecting, by a sensor operating in conjunction with a computing device of a vehicle, a road agent at a distance from the vehicle, analyzing, by the computing device of the vehicle, one or more characteristics of the road agent at the distance, generating, by the computing device, a targeted warning based on analyzing the one or more characteristics of the road agent at the distance, and outputting, by a component operating in conjunction with the computing device of the vehicle, the targeted warning in association with the road agent at the distance.

18 Claims, 9 Drawing Sheets

(56) References Cited

U.S. PATENT DOCUMENTS

| | | | |
|---|---|---|---|
| 10,205,428 B1* | 2/2019 | Paepcke | B60Q 5/008 |
| 2011/0128161 A1 | 6/2011 | Bae et al. | |
| 2013/0343071 A1* | 12/2013 | Nagaoka | B60Q 9/008 |
| | | | 362/466 |
| 2014/0267398 A1* | 9/2014 | Beckwith | G08G 1/166 |
| | | | 345/633 |
| 2017/0057497 A1* | 3/2017 | Laur | G06K 9/00348 |
| 2017/0205506 A1* | 7/2017 | Voorheis | G01S 13/66 |
| 2018/0186368 A1* | 7/2018 | Kim | B60T 7/22 |
| 2018/0236985 A1* | 8/2018 | Kim | B60Q 9/008 |
| 2019/0283746 A1 | 9/2019 | Shalevshwartz et al. | |
| 2021/0118303 A1* | 4/2021 | Chan | B60Q 1/525 |
| 2021/0350703 A1* | 11/2021 | Mackenzie | G06V 20/56 |

* cited by examiner

METHODS AND SYSTEMS FOR GENERATING TARGETED WARNINGS

TECHNICAL FIELD

The embodiments described herein generally relate to generating targeted warnings to alert road agents of the presence of vehicles, and more specifically, to generating and outputting targeted warnings in association with road agents that are located at a certain distance from a vehicle.

BACKGROUND

Conventional vehicle systems may output certain basic warnings upon detecting pedestrians or vehicles within a certain proximity of the vehicle, e.g., car horns, etc. However, these systems fail to include the functionality to generate and output warnings that are specific to the position and orientation of a road agent (e.g., pedestrians, vehicles, bicyclists, scooter operators, skateboarders, etc.) without affecting or interfering with one or more road agents nearby.

Accordingly, a need exists for a vehicle system that generates and outputs targeted warnings to notify a road agent of the presence of a vehicle within a certain proximity of the pedestrian in order to reduce the likelihood of accidents.

SUMMARY

In one embodiment, a method for generating and outputting a targeting warning in association with a road agent is provided. The method includes detecting, by a sensor operating in conjunction with a computing device of a vehicle, a road agent at a distance from the vehicle, analyzing, by the computing device of the vehicle, a position of the road agent at the distance, generating, by the computing device, a targeted warning based on analyzing the position of the road agent at the distance, and outputting, by a component operating in conjunction with the computing device of the vehicle, the targeted warning in association with the road agent at the distance.

In another embodiment, a system for alerting a road agent is provided. The system includes a sensor of a vehicle, a component of the vehicle, and a computing device of the vehicle. The computing device is configured to detect, by the sensor operating in conjunction with the computing device of the vehicle, the road agent at a distance from the vehicle, a position of the road agent at the distance, analyze, by the computing device of the vehicle, a position of the road agent at the distance, generate, by the computing device, a targeted warning based on analyzing the position of the road agent at the distance; and output, by the component operating in conjunction with the computing device of the vehicle, the targeted warning in association with the road agent at the distance.

In another embodiment, a method for generating and outputting a targeting warning in association with a road agent is provided. The method includes detecting, by a sensor operating in conjunction with a computing device of a vehicle, a road agent at a distance from the vehicle, analyzing, by the computing device of the vehicle, a position of the road agent at the distance, and outputting, by a component operating in conjunction with the computing device of the vehicle, a targeted warning in association with the road agent at the distance.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and example in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein describe methods and systems for generating and outputting a targeting warning in association with a road agent. For example, the vehicle system as part of a vehicle described herein includes at least a sensor, a plurality of cameras (inward facing and outward facing), and a computing device. In some embodiments, these components, operating in conjunction, are configured to detect a road agent (e.g., pedestrians, bicyclists, scooter operators, skateboarders, autonomous and non-autonomous vehicles, etc.) a certain distance away from the vehicle, analyze one or more characteristics of the road agent, generate a targeted warning, and output the targeted warning to the road agent. Moreover, the targeted warning is output such that it is associated with a perimeter around the road agent and serves to warn the road agent without interfering of affecting other road agents or vehicles within a vicinity of the road agent.

Figure 1:
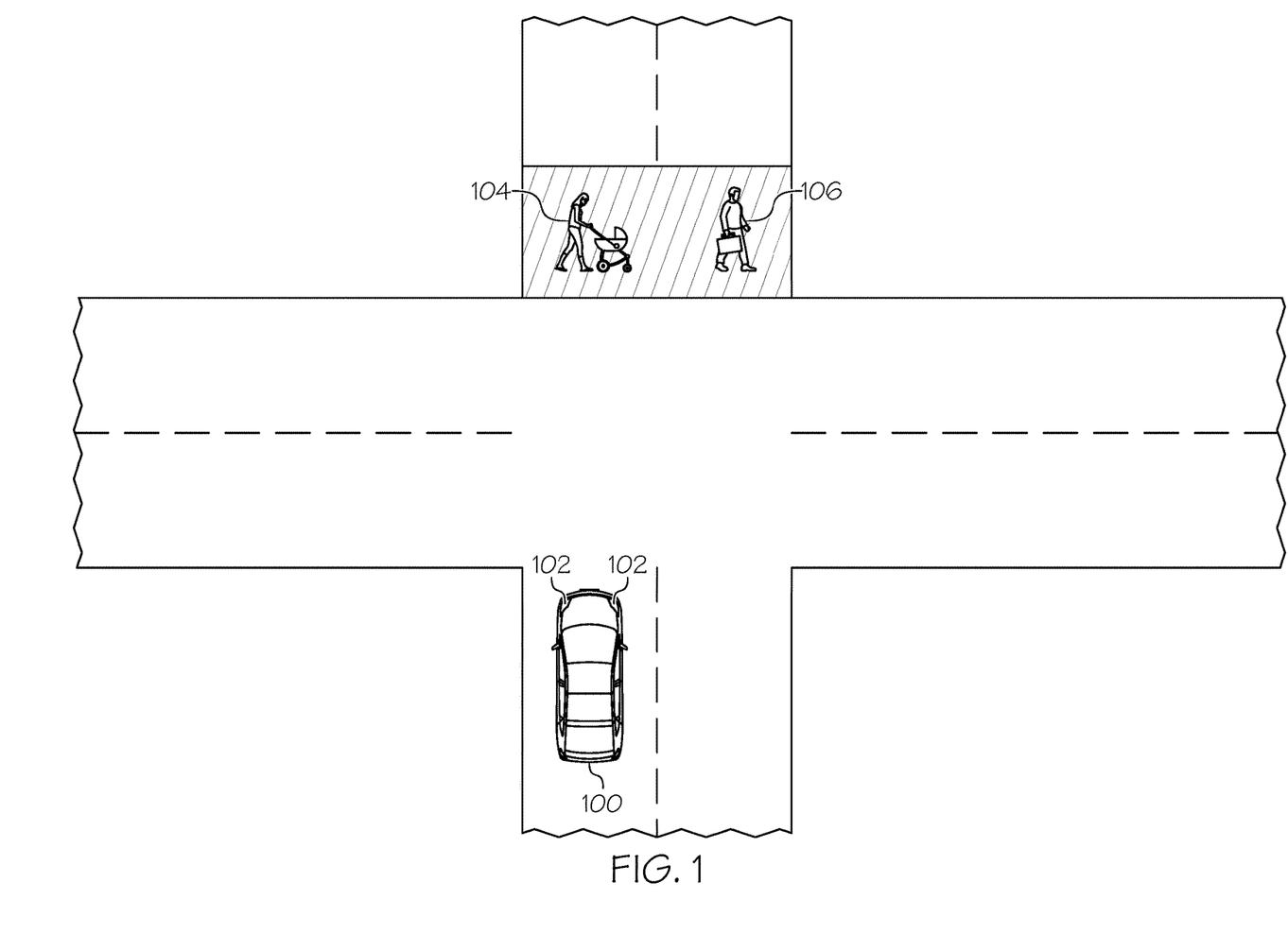
FIG. 1 schematically depicts a vehicle including a vehicle system that is configured to generate a targeted warning and output the targeted warning in association with a road agent located at a certain distance away from the vehicle, according to one or more embodiments described and illustrated herein.

Referring now to the drawings, FIG. 1 schematically depicts a vehicle 100 including a vehicle system (not shown in FIG. 1, but depicted in FIG. 2) that is configured to generate a targeted warning and output the targeted warning in association with a road agent located at a certain distance away from the vehicle 100, according to one or more embodiments described and illustrated herein.

The vehicle 100, illustrated as being located at an intersection on a roadway, includes headlights 102 and a vehicle system configured within the vehicle. In embodiments, the vehicle system may detect a road agent 104 (e.g., a pedestrian) at a certain distance away from vehicle 100. Additionally, the vehicle system may analyze a position of the road agent 104 relative to the vehicle 100, e.g., the orientation of a head of the road agent, orientation of the eyes of the road agent, posture, the direction in which the road agent is walking, etc. In embodiments, the vehicle system of the vehicle 100 may generate a targeted warning based on the analysis of the position of the road agent relative to the vehicle 100 and output the targeted warning in association with the road agent located at a certain distance away from the vehicle. In embodiments, the targeted warning may be lights that are output by the headlights 102 of the vehicle 100 relative to the road agent 104 in a manner that notifies the road agent of the presence of the vehicle 100, without affecting or interfering with the activities other road agents nearby, e.g., road agent 106. The manner in which the targeted warning is generated and output by the vehicle system will be described in further detail below.

Figure 2:
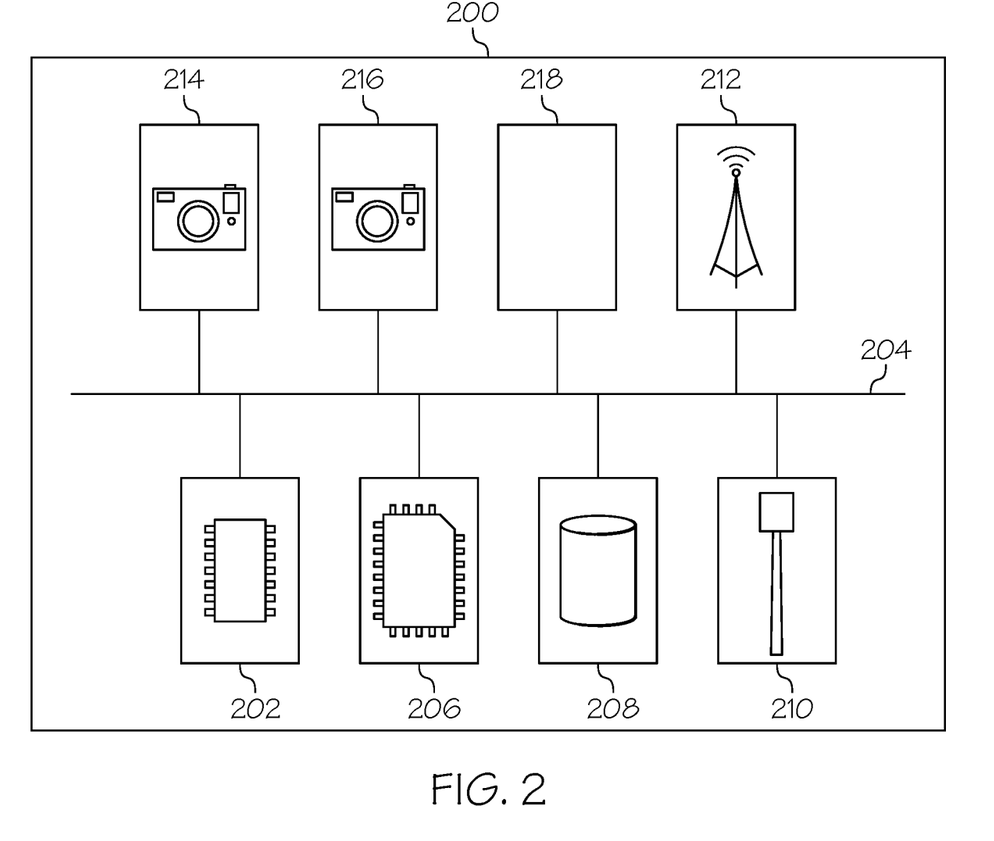
FIG. 2 schematically depicts components of a vehicle system that is configured to generate and output a targeted warning in association with a road agent, according to one or more embodiments shown herein.

FIG. 2 schematically depicts components of a vehicle system 200 that is configured to generate and output a targeted warning in association with a road agent, according to one or more embodiments shown herein. While the vehicle system 200 is depicted in isolation in FIG. 2, the vehicle system 200 may be included within a vehicle. For example, the vehicle system 200 may be included within the vehicle 100 shown in FIG. 1. In embodiments in which the vehicle system 200 is included within the vehicle 100, such a vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

In embodiments, the vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

In the vehicle system 200, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like. Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like.

Additionally, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In some embodiments, the one or more memory modules 206 may store data related to various environmental and traffic conditions, location information of various external device (e.g., other vehicle and/or traffic cones), and so forth.

Referring still to FIG. 2, the vehicle system 200 comprises one or more sensors 208. Each of the one or more sensors 208 is coupled to the communication path 204 and communicatively coupled to the one or more processors 202. The one or more sensors 208 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle. In embodiments, the sensors 208 may also include motion sensors and/or proximity sensors that are configured to detect road agents and movements of road agents (e.g., pedestrians, other vehicles, etc.) within a certain distance from these sensors.

Referring to FIG. 2, the vehicle system 200 comprises a satellite antenna 210 coupled to the communication path 204 such that the communication path 204 communicatively couples the satellite antenna 210 to other modules of the vehicle system 200. The satellite antenna 210 is configured to receive signals from global positioning system satellites. Specifically, in one embodiment, the satellite antenna 210 includes one or more conductive elements that interact with electromagnetic signals transmitted by global positioning system satellites. The received signal is transformed into a data signal indicative of the location (e.g., latitude and longitude) of the satellite antenna 210 or an object positioned near the satellite antenna 210, by the one or more processors 202.

Still referring to FIG. 2, the vehicle system 200 comprises network interface hardware 212 (e.g., a data communication module) for communicatively coupling the vehicle system 200 to various external devices, e.g., remote servers, cloud servers, etc. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, the network interface hardware 212 (e.g., a data communication module) may receive data related to environmental and traffic conditions from various external devices, e.g., traffic cone and/or other vehicles. In embodiments, the network interface hardware 212 may utilize or be compatible with a communication protocol that is based on dedicated short range communications (DSRC). In other embodiments, the network interface hardware 212 may utilize or be compatible with a communication protocol that is based on vehicle-to-everything (V2X). Compatibility with other communication protocols is also contemplated.

Still referring to FIG. 2, the vehicle system 200 includes an outward facing camera 214. The outward facing camera 214 may be installed on a front portion of the vehicle 100 such that this camera may capture one or more images or a live video stream of stationary and moving objects (e.g., road agents such as pedestrians, other vehicles, etc.) within a certain proximity of the vehicle 100. The outward facing camera 214 may be any device having an array of sensing devices capable of detecting radiation in an ultraviolet wavelength band, a visible light wavelength band, or an infrared wavelength band. The camera may have any resolution. In some embodiments, one or more optical components, such as a mirror, fish-eye lens, or any other type of lens may be optically coupled to the camera. In embodiments, the outward facing camera 214 may have a broad angle feature that enables capturing digital content within a 150 degree to 180 degree arc range. Alternatively, the outward facing camera 214 may have a narrow angle feature that enables capturing digital content within a narrow arc range, e.g., 60 degree to 90 degree arc range. In embodiments, the outward facing camera 214 may be capable of capturing standard or high definition images in a 720 pixel resolution, a 1080 pixel resolution, and so forth. Alternatively or additionally, the outward facing camera 214 may have the functionality to capture a continuous real time video stream for a predetermined time period.

Still referring to FIG. 2, the vehicle system 200 includes an inward facing camera 216 (e.g., an additional camera). The inward facing camera 216 maybe installed within an interior of the vehicle 100 such that this camera may capture one or more images or a live video stream of the drivers and passengers within the vehicle 100. In embodiments, the one or more images or a live video stream that is captured by the inward facing camera 216 may be analyzed by the one or more processors 202 to determine the orientation of the heads, eyes, etc., of the drivers and passengers in relation to one or more objects (e.g., road agents such as pedestrians, other vehicles, etc.) that are external to the vehicle 100. The inward facing camera 216 may be any device having an array of sensing devices capable of detecting radiation in an ultraviolet wavelength band, a visible light wavelength band, or an infrared wavelength band. The camera may have any resolution. In some embodiments, one or more optical components, such as a mirror, fish-eye lens, or any other type of lens may be optically coupled to the camera. In embodiments, the inward facing camera 216 may have a broad angle feature that enables capturing digital content within a 150 degree to 180 degree arc range. Alternatively, the inward facing camera 216 may have a narrow angle feature that enables capturing digital content within a narrow arc range, e.g., 60 degree to 90 degree arc range. In embodiments, the inward facing camera 216 may be capable of capturing standard or high definition images in a 720 pixel resolution, a 1080 pixel resolution, and so forth. Alternatively or additionally, the inward facing camera 216 may have the functionality to capture a continuous real time video stream for a predetermined time period.

Still referring to FIG. 2, the vehicle system 200 includes the speaker 218 for transforming data signals from the vehicle system 200 into mechanical vibrations, such as in order to output audible prompts or audible information from the vehicle system 200. The speaker 218 is coupled to the communication path 204 and communicatively coupled to the one or more processors 202. The speaker 218 includes the functionality of transmitting audio output warnings (a horn, siren, etc.) at particular frequencies and at specific decibel levels that are directed to areas that are external to the vehicle and within a vicinity of road agents in a precise and targeted manner. In embodiments, the speaker 218 is capable of generating sound beams or a narrow beam of sound waves that may focused (similar to a laser beam). These sound beams may travel large distances and remain concentrated. In some embodiments, these sound beams may have the highest decibel levels at the center of beam. The decibel levels may dissipate as the distance increases from the center of the beam to the periphery. In contrast with conventional speakers, the speaker 218 may be a directional speaker that is configured to output clear information over large distances while consuming less power, as the speaker 218 does not need to output sound over a large surface area. Thus, in embodiments, the speaker 218 outputs sound beams in a focused and concentrated manner such that road agents directly in front of the speaker 218 are the only ones that hear the sound beams, thereby reducing the likelihood that the sound beams affect or interfere with the activities of nearby road agents.

Figure 3:
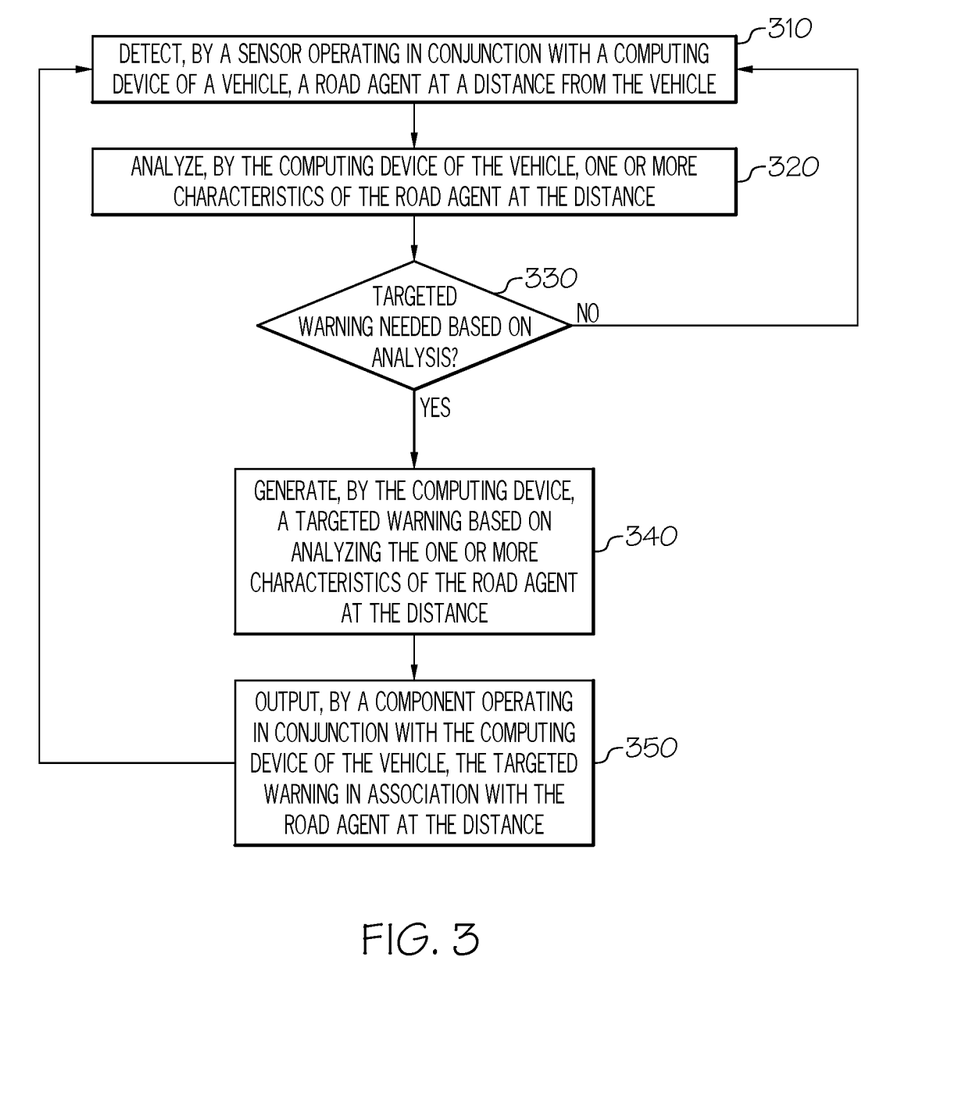
FIG. 3 schematically depicts a flowchart for generating and outputting a targeted warning in association with a road agent located at a certain distance from the vehicle, according to one or more embodiments described and illustrated herein.

FIG. 3 schematically depicts a flowchart for generating and outputting a targeted warning in association with a road agent located at a certain distance from the vehicle, according to one or more embodiments described and illustrated herein.

In embodiments, in block 310, the vehicle system 200 of the vehicle 100 detects, using one or more sensors 208 operating in conjunction with the one or more processors 202, a road agent (e.g., a pedestrian) located at a distance from the vehicle 100. For example, the vehicle system 200 may utilize a motion sensor, a proximity sensor, and/or one or more cameras, each of which may operate in conjunction with the one or more processors 202 of the vehicle system, to detect an object within a certain vicinity of the vehicle 100, e.g., pedestrians, other vehicles, etc. For instance, upon the motion sensor detecting a road agent a certain distance away from the vehicle 100, the one or more processors 202 may instruct the camera to take an image or a live video stream of the detected road agent. Example operations of the vehicle system 200 is depicted in FIGS. 4A-6B, and described later on in this disclosure.

In some embodiments, in block 320, the one or more processors 202 of the vehicle system 200 may analyze the captured images or live video stream of the road agent 104 located a certain distance away from the vehicle 100. For example, the one or more processors 202 may utilize various object detection and recognition techniques (various digital image processing techniques) to analyze one or more characteristics of the road agent. These characteristics may include the direction that the road agent may be walking on a crosswalk, the direction or orientation of various body parts (e.g., whether the pedestrian is facing forwards, upwards, etc.) while the road agent is walking, etc. In short, the one or more processors 202 analyze these characteristics to determine whether the road agent is aware of the presence of the vehicle 100 within a certain vicinity.

In some embodiments, in block 330, the one or more processors 202 may determine based on the analysis performed in block 320, whether a targeted warning needs to be generated. For example, if the one or more processors 202 determine that there is a high likelihood that the road agent is aware of the presence of vehicle 100, the one or more processors 202 may not generate a targeted warning and the process may go back to block 310 where another road agent is detected in the future. In embodiments, an orientation of a road agent's head (e.g., turned towards the vehicle 100) may be a characteristic that is indicative of the road agent's awareness of the vehicle 100. Other such characteristics, orientations, etc., are also contemplated. In a non-limiting example, the analysis of the one or more characteristics may be based on one or more supervised machine learning techniques, which may be utilized to predict the likelihood that a road agent is aware of the presence of the vehicle by analyzing, e.g., the orientation of one or more body parts of the road agent relative to the vehicle 100. In a non-limiting example, the degree or extent to which a road agent's head or body is turned towards the vehicle 100 may be compared to a threshold value, which enables the vehicle system 200 to determine whether a targeted warning should be generated. Other rules and thresholds for determining whether a targeted warning should be generated are also contemplated.

In embodiments, in block 340, the vehicle system 200 may generate a targeted warning based on the results of the analysis step described in block 320. In some embodiments, if the one or more processors 202 determine that the road agent is not aware of the presence of the vehicle 100, e.g., if the road agent's head is pointed downwards, or in a direction or orientation from which he or she is unable to see the vehicle 100, the one or more processors 202 may generate a targeted warning, thereby reducing the likelihood of accidents or collisions.

In embodiments, the one or more processors 202 may generate targeted warnings in a variety of ways. For example, the targeted warnings may be instructions that are generated by the one or more processors 202, which result in one or more components of the vehicle performing various actions. In some embodiments, these instructions may be for the headlights 102 to output lights in a predetermined sequence or pattern onto a specific body part of the road agent. As a non-limiting example, the headlights 102 may be collimated beam headlights (e.g., laser headlights) that are configured to output lights in a focused manner and with high intensity such that the light that is output onto a desired road agent but not surrounding road agents. In this way, the light is targeted primarily towards a particular road agent and functions such that it does not interfere or affect nearby road agents. As a non-limiting example, the light or lights targeted to the road agent may include different flash patterns. For example, the flash patterns may be a combination of different colors (e.g., prominent colors such as red, blue, etc.) emitted by the headlights at certain frequencies. For example, in certain situations, a red colored light may be emitted at certain intervals of, e.g., 0.3 seconds, 0.5 seconds, etc. The interval may be large if the distance between the vehicle 100 and the road agent is high, which indicates that a likelihood of a collision between the road agent and the vehicle is not very high. In another example, a red colored light may be emitted as part of a rapid flashing pattern, e.g., emitted at intervals of 0.1 second, in order to maximize the likelihood of notifying the road agent of the presence of the vehicle 100 in a situation in which the likelihood of a collision is high. Various color combinations and intervals are contemplated.

In some embodiments, the targeted warning may be instructions that enable a speaker to output an audio signal that is output by the speaker 218 of the vehicle 100 such that the audio signal may be targeted to a particular road agent. In embodiments, the vehicle system 200 may be configured to generate instructions such that both the speaker and the headlights 102 are simultaneously or sequentially instructed to output lights and audio signals as targeted warnings. As stated, the audio signal that is output by the speaker 218 may be focused and concentrated sound beams. In some embodiments, these sound beams may have the highest decibel levels at the center of beam. The decibel levels may reduce as the distance increases from the center of the beam to the periphery. The sound beams may be output in a focused and concentrated manner such that road agents directly in front of the speaker 218 are road agents that hear the sound beams, thereby reducing the likelihood that the sound beams affect or interfere with the activities of nearby road agents.

In embodiments, in block 350, the vehicle system 200 may output the targeted warning, which is generated as described in block 340, in association with a road agent at a particular distance. In embodiments, the targeted warning may be an audio signal, a light output in a particular pattern, or a combination thereof. Other varieties of targeted warnings are also contemplated. A targeted warning output by the headlights 102 may be lights that are output in the form of a collimated beam from laser headlights. These lights may be output in a focused manner such that the lights are restricted to a particular area, e.g., restricted to a certain distance above the head of, in front, behind, and around a vicinity of the road agent 104. Additionally, in a non-limiting example, a targeted warning in the form of an audio signal generated by the speaker 218 may be narrow sound beams that are generated by a directional speaker. These sounds beams, when output, travel large distances, remain concentrated, and may have the highest decibel levels at the center of these beams. Additionally, the decibel levels may dissipate as the distance increases from the center of the beam to the periphery. In some embodiments, such sound beams are heard primarily by road agents directly in front the speaker 218, and as such, do not interfere with or affect the activities of nearby road agents.

Figure 4A:
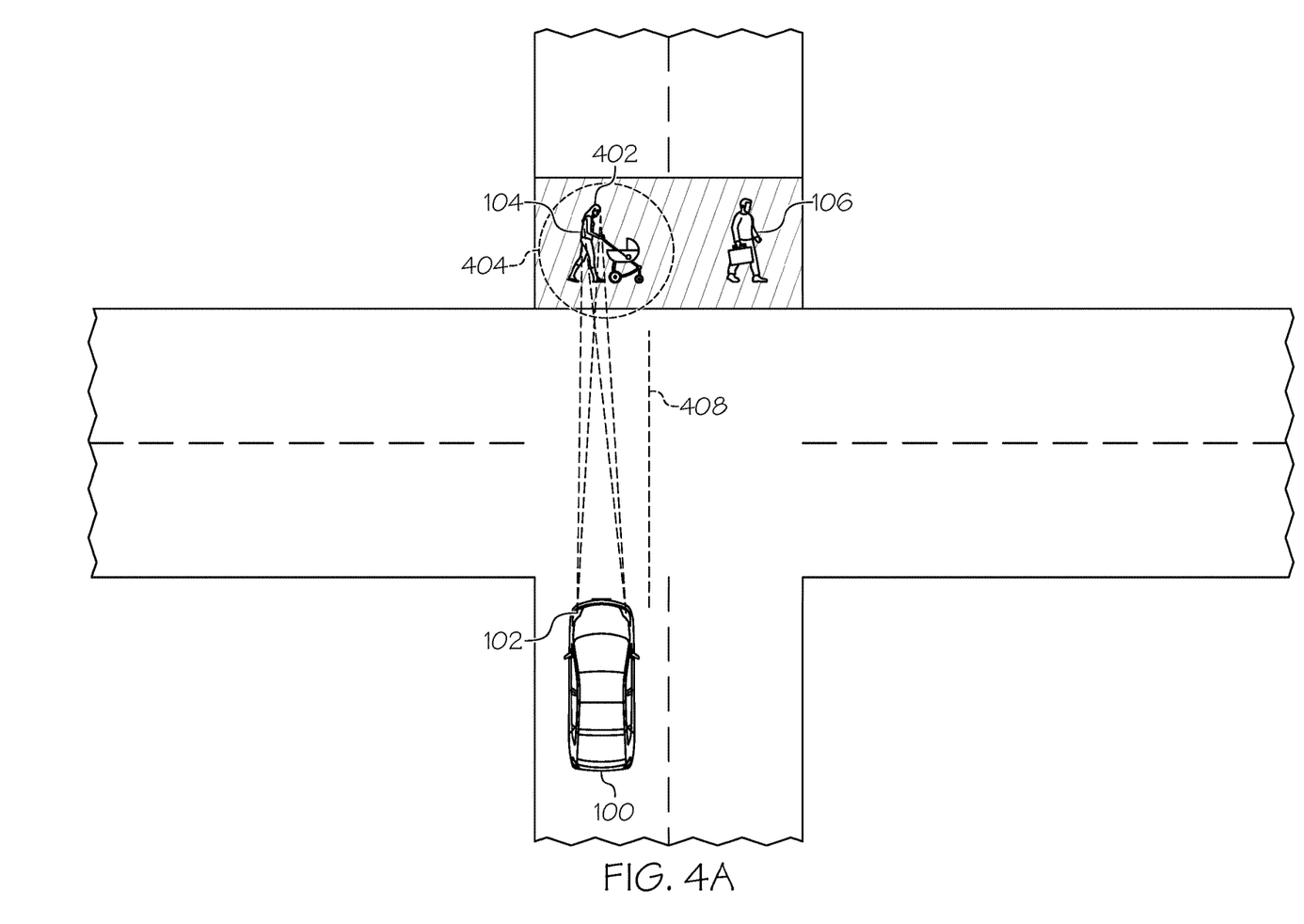
FIG. 4A schematically depicts an example operation of the vehicle system of the vehicle described herein that is configured to generate and output a targeted warning in the form of light that is output in association with a road agent (e.g., a pedestrian), according to one or more embodiments described and illustrated herein.

FIG. 4A schematically depicts an example operation of the vehicle system 200 of the vehicle 100 described herein that is configured to generate and output a targeted warning in the form of light that is output in association with a road agent (e.g., a pedestrian), according to one or more embodiments described and illustrated herein.

In some embodiments, the vehicle 100 is shown to be located at an intersection of a roadway a certain distance away (e.g., distance 408) from road agents 104, 106, who are shown to be crossing an intersection. In some embodiments, a motion sensor and/or a proximity sensor (one or more sensors 208) may detect the road agent 104 a certain distance away from the vehicle 100, e.g., 5 feet away, 10 feet away, etc. In some embodiments, upon detection of the road agent 104, the one or more processors 202 of the vehicle system 200 may instruct the outward facing camera 214 to capture one or more images of the road agent 104. In some embodiments, the one or more processors 202 may, automatically and without user intervention, instruct the outward facing camera 214 to capture one or more images or a live video stream of the road agent 104 upon the road agent 104 appearing within a field of view of the outward facing camera 214. In some embodiments, as the road agent 106 is shown to have walked across the crosswalk, the road agent 106 may be considered outside the field of view of the outward facing camera 214. As such, no action may be taken by the outward facing camera 214 relative to the road agent 106.

The one or more processors 202 may analyze a position of the road agent 104 by processing and/or examining the one or more images of the road agent 104 that are captured by the outward facing camera 214. For example, the one or more processors 202 may analyze these images to determine positions, orientations, and other such aspects of the road agent 104, e.g., the orientation 402 of the head of the road agent 104, the direction that the road agent 104 is facing, etc. The one or more processors 202 may determine that the orientation 402 of head of the road agent 104 is facing downwards and her body position appears to be facing forward. Additionally, the one or more processors 202 may analyze such aspects of the road agent 104 in relation to a particular distance that the road agent 104 located from the vehicle 100.

The one or more processors 202 may generate a targeted warning based on analyzing the position of the road agent at the distance. For example, based on analyzing the one or more images the road agent 104 (e.g., determining that the orientation 402 of the head of the road agent 104 is facing downwards and the road agent 104 is walking across a sidewalk), the one or more processors 202 may determine that there is a strong likelihood that road agent 104 is unaware of the presence of vehicle 100 a certain distance away. As such, one or more processors 202 of the vehicle system 200 may determine that generating a targeted warning may significantly reduce the likelihood of an accident or collision. In embodiments, such a targeted warning also reduces the likelihood of the road agent 104 changing directions or slowing down the pace at which she may be walking, etc. In some embodiments, the targeted warning that is generated may be based on lights, audio, and/or a combination thereof. Additionally, the targeted warning may be output, by a component operating in conjunction with one or more processors of the vehicle 100, in association with the road agent 104 located at a certain distance away from the vehicle 100.

For example, the one or more processors 202 may generate instructions that may instruct the headlights 102 of the vehicle 100 to output light that is displayed in a manner that is targeted to or restricted within the area 404 (e.g., 10 meters, 7.5 meters, 5 meters, 2.5 meters, 1 meter, etc.), as depicted in FIG. 4A. In a non-limiting example, the area 404 refers to a distance ranging from the bottom portion to the top portion of the road agent and may cover a certain distance around a perimeter of the road agent. In other words, certain distance above the head of, in front, behind, and around a vicinity of the road agent 402. In embodiments, the headlights 102 may be collimated beam headlights (e.g., laser headlights) that are configured to output lights in a focused manner and with high intensity such that the outputted light is restricted to the area 404. In particular, the outputted light may be a focused light beam of medium to high intensity that is displayed in a largely spherical shape on the road agent 104. The size and dimensions of the area 404 may vary, e.g., the spherical shape may be smaller and the intensity of the light beam may be higher, making the light beam more constricted and precise. The outputted light may also be restricted to a certain perimeter around the road agent 104, e.g., around a 1-foot radius of the road agent 104.

The outputted light may also take the form of lights that are output at certain predefined time intervals. In other embodiments, a first outputted focused light beam may be of a certain intensity level and a second outputted focused light beam may be of a higher intensity level. Other permutations and combinations of light beams are also contemplated. It is also noted that the focused light beams enable the vehicle system 200 to generate a targeted warning that is restricted to a particular road agent (e.g., the road agent 104) without interfering or affecting other road agents, e.g., the road agent 106, who may be located outside the field of view of the vehicle 100. In other words, the vehicle system 200 generates a precise warning that is configured to notify certain road agents (e.g., the road agent 104) of the presence of the vehicle 100.

Figure 4B:
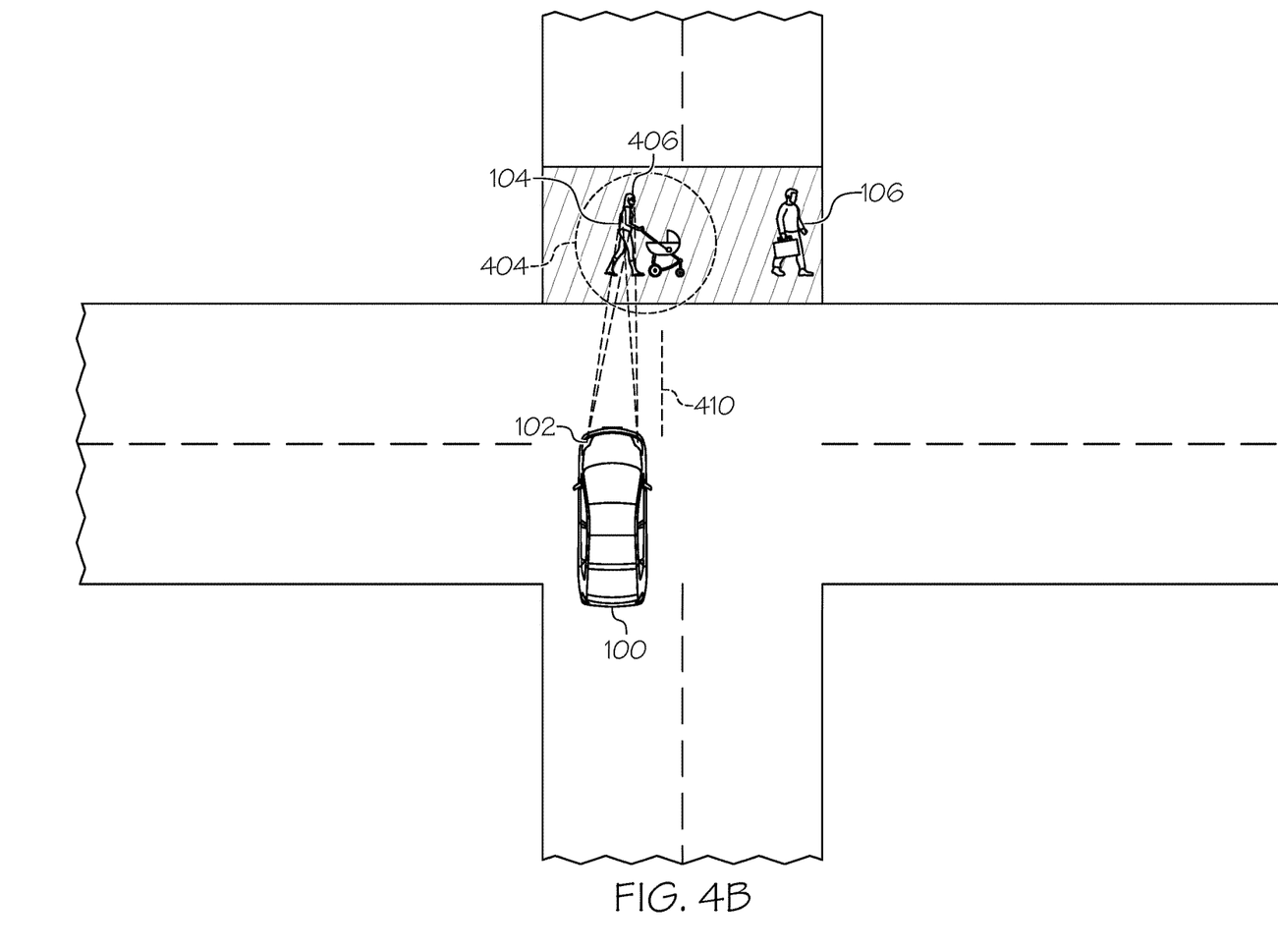
FIG. 4B schematically depicts another example operation of the vehicle system of the vehicle described herein that is configured to generate and output a targeted warning associated with the road agent, according to one or more embodiments described and illustrated herein.

FIG. 4B schematically depicts another example operation of the vehicle system 200 of the vehicle 100 described herein that is configured to generate and output a targeted warning associated with the road agent 104, according to one or more embodiments described and illustrated herein. In particular, FIG. 4B depicts a continuation of the example operation depicted and described in FIG. 4A. For example, in embodiments, if a certain targeted warning (as depicted in FIG. 4A) fails to effectively notify the road agent 104 of the presence of the vehicle 100, the vehicle system 200 may generate an additional targeted warning that may be a variation on a previously output light based targeted warning. As shown in FIG. 4B, the road agent 104 may not have noticed a warning that was previously provided and may have continued walking along the crosswalk. Specifically, after receiving a targeted warning as depicted in FIG. 4A, the outward facing camera 214 may continue to detect the road agent 104 within the field of view of the outward facing camera 214. As such, the one or more processors 202 may instruct the outward facing camera 214 to capture additional images of the road agent 104. When these images are analyzed, the one or more processors 202 may determine that the body position or orientation of the road agent 104 is facing forward and orientation 406 of the head of the road agent 104 is also facing forward, indicating that the road agent 104 likely continues to be unaware of the presence of the vehicle 100. In one scenario, the road agent 104 may be walking along the crosswalk when a traffic light may have outputted a green light indicating that the vehicle 100 has the right of way to proceed along the roadway. As such, the additional targeted warning may alert the road agent 104 of the right of way of the vehicle 100, thereby preventing the likelihood of accidents, traffic jams, etc.

In embodiments, the additional targeted warning may be in the form of light that is output, e.g., at predefined intervals, with higher intensity levels, etc., such that the road agent 104 is more likely to be aware the presence of the vehicle 100. In some embodiments, the additional targeted warning may be output by the headlights 102 of the vehicle 100 when the vehicle 100 is closer to the road agent 104 (e.g., at distance 410) as compared to the location of the vehicle 100 relative to the road agent 104 depicted in FIG. 4A. As previously stated, the focused light beam may be output at a higher intensity within the area 404. In some embodiments, the light beam may be output at a higher intensity within a smaller area such that the road agent 104 is more likely to be notified of the presence of the vehicle 100. In this way, in the example operation depicted in FIG. 4B, the vehicle system 200 will output a set of one or more additional targeted warnings in association with the road agent 104 that will more effectively draw the attention of the road agent 104.

Figure 5A:
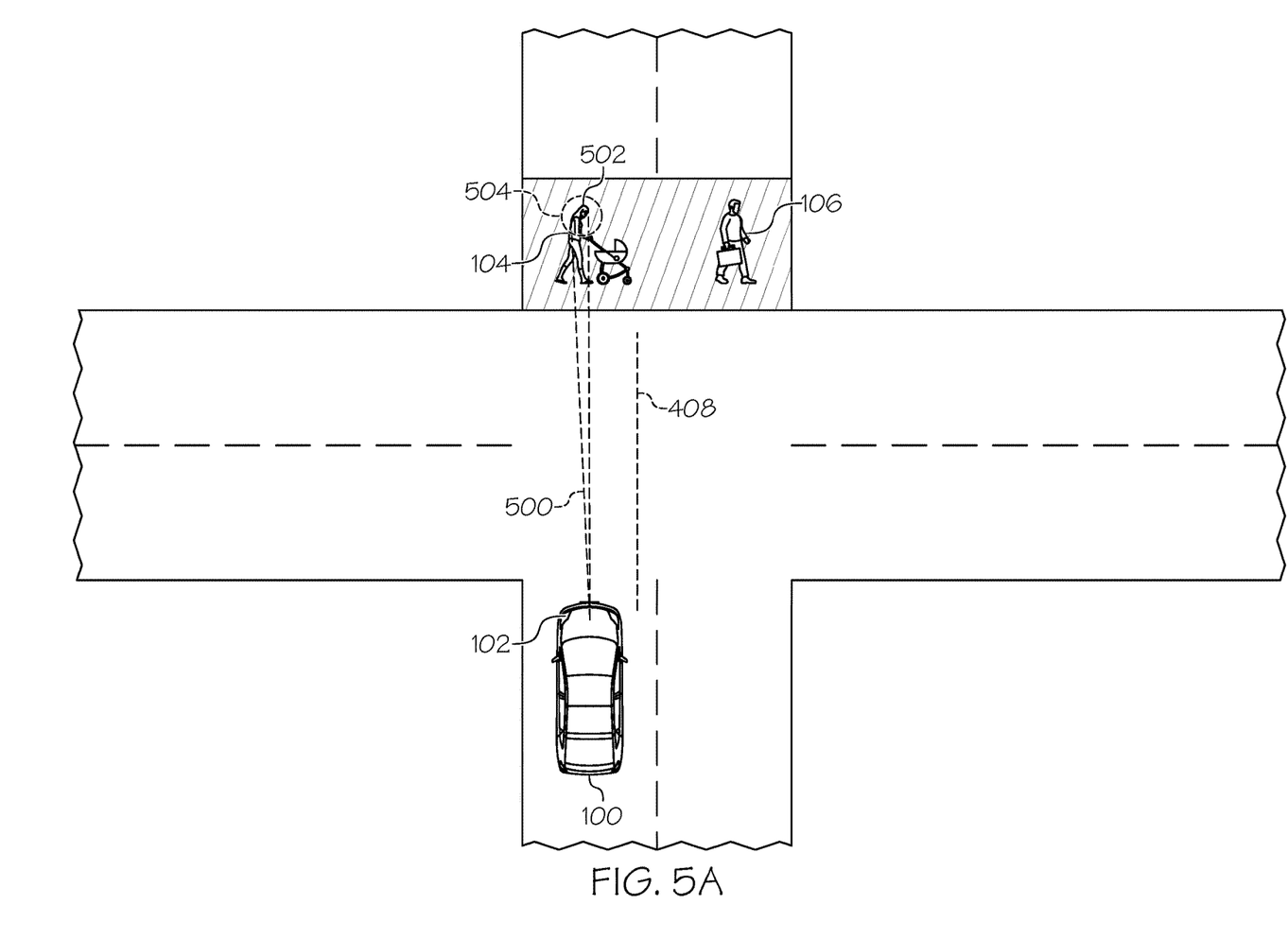
FIG. 5A schematically depicts an example operation of the vehicle system of the vehicle described herein that is configured to generate a targeted warning in the form of an audio signal that is output in association with a road agent, according to one or more embodiments described and illustrated herein.

FIG. 5A schematically depicts an example operation of the vehicle system 200 of the vehicle 100 described herein that is configured to generate a targeted warning in the form of an audio signal 500 (e.g., an audio alarm) that is output in association with a road agent, according to one or more embodiments described and illustrated herein.

Specifically, in FIG. 5A, the vehicle 100 may be located at a distance 408 of the road agent 104. As stated, in some embodiments, a motion sensor and/or a proximity sensor (e.g., one or more sensors 208) may detect the road agent 104 at the distance 408 and instruct the outward facing camera 214 to capture one or more images of the road agent 104. In other embodiments, the one or more processors 202 may, automatically and without user intervention, instruct the outward facing camera 214 to capture one or more images or a live video stream of the road agent 104 upon the road agent 104 appearing within the field of view of the outward facing camera 214. The one or more processors 202 may analyze the captured one or more images or the live video and determine that the orientation 502 of the head of the road agent 104 may be pointed downwards, indicating that the road agent 104 is unaware of the presence of the vehicle 100 at the distance 408. Based on this analysis, the one or more processors 202 may generate a targeted warning in the form of an audio signal 500 (e.g., an audio alarm). In some embodiments, the one or more processors 202 may instruct a speaker 218 to output the audio signal 500 in association with the road agent 104 located at the distance 408 away from the vehicle 100. In embodiments, the audio signal 500 may be output at a decibel level such that the audio signal 500 may notify the road agent 104 of the presence of the vehicle 100 without offending or interfering with the activities of other road agents (e.g., pedestrians, bicyclists, scooter operators, skateboarders, autonomous and non-autonomous vehicles, etc.) within a certain proximity. In embodiments, the audio signal 500 may be an audio signal that is output from, e.g., a speaker that generates audio signals as a narrow beam of soundwaves that may be focused similar to a laser beam. In embodiments, these sound waves may travel large distances and are loudest at the center of the wave such that the audio signal 500 output from the 218 may be loudest at the center of the area 504. Additionally, in embodiments, the audio signal 500 that is output may be combined with light that is output from the headlights 102 simultaneously such that two targeted warnings may simultaneously be output in order to inform the road agent 104 of the presence of the vehicle 100.

Figure 5B:
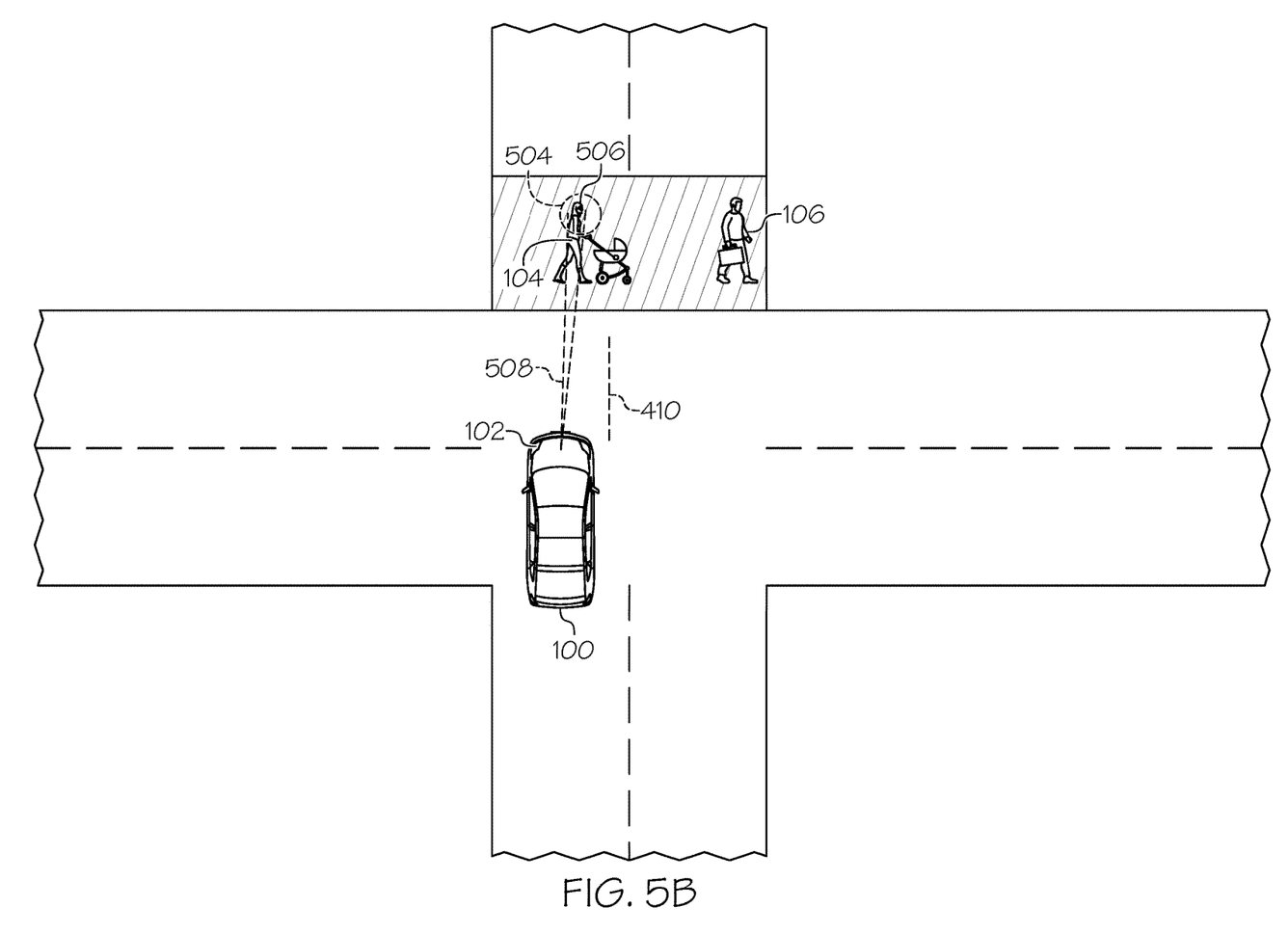
FIG. 5B schematically depicts another example operation of the vehicle system that is configured to generate a targeted warning in the form of an audio signal that is output in association with a road agent, according to one or more embodiments described and illustrated herein.

FIG. 5B schematically depicts another example operation of the vehicle system 200 that is configured to generate a targeted warning in the form of an additional audio signal 508 (e.g., an additional audio alarm) that is output in association with a road agent, according to one or more embodiments described and illustrated herein. FIG. 5B depicts a continuation of the example operation depicted in FIG. 5A. For example, in embodiments, if a certain targeted warning (as depicted in FIG. 5A) fails to effectively notify the road agent 104 of the presence of the vehicle 100, the vehicle system 200 may generate an additional targeted warning that may be a variation on a previously output audio based targeted warning.

As shown in FIG. 5B, the road agent 104 may not have noticed a warning that was previously provided and may have continued walking along the crosswalk. Specifically, after receiving a targeted warning as depicted in FIG. 5A, the outward facing camera 214 may continue to detect the road agent 104 within the field of view of the outward facing camera 214. As such, the one or more processors 202 may instruct the outward facing camera 214 to capture additional images of the road agent 104. When these images are analyzed, the one or more processors 202 may determine that the body position or orientation of the road agent 104 is facing forward and orientation 506 of the head of the road agent 104 may be facing upwards, forwards, etc., indicating that the road agent 104 likely continues to be unaware of the presence of the vehicle 100. For example, the road agent 104 may be walking along the crosswalk when a traffic may have outputted a green light indicating that the vehicle 100 has the right of way to proceed along the roadway.

In embodiments, the additional targeted warning may be in the form of the additional audio signal 508 that varies from the audio signal 500 depicted in FIG. 5A. For example, the additional audio signal 508 may be at a higher decibel level than the audio signal 500 such that the road agent 104 is more likely to be aware of the presence of the vehicle 100. In some embodiments, additional targeted warning (the additional audio signal 508) having the higher decibel level may be combined with lights that are output by the headlights 102 in order to provide two targeted warnings simultaneously, in order to notify the road agent 104 of the presence of the vehicle 100. Such targeted warnings may be output by the speaker 218 and the headlights 102 of the vehicle 100 when the vehicle 100 is closer to the road agent 104 (e.g., at distance 410) as compared to the location of the vehicle 100 relative to the road agent 104 depicted in FIG. 5A. In this way, the vehicle system 200 will output a set of targeted warnings in association with the road agent 104 that will more effectively draw the attention of the road agent 104.

Figure 6A:
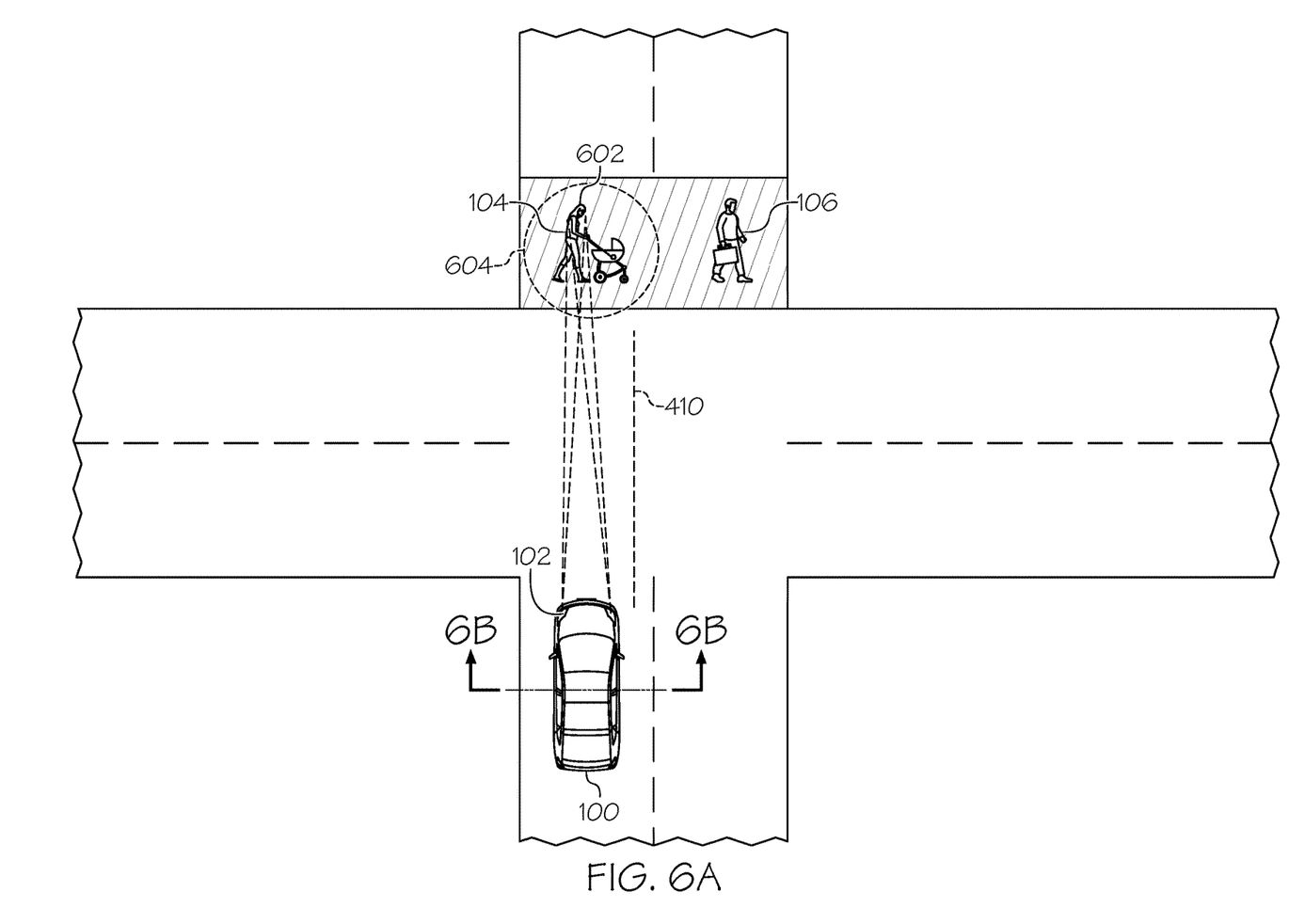
FIGS. 6A and 6B schematically depict an example operation of the vehicle system that is configured to generate a targeted warning in the form of an audio signal that is output in association with a road agent based on detecting the gaze of one or individuals within the vehicle, according to one or more embodiments described and illustrated herein.
Figure 6B:
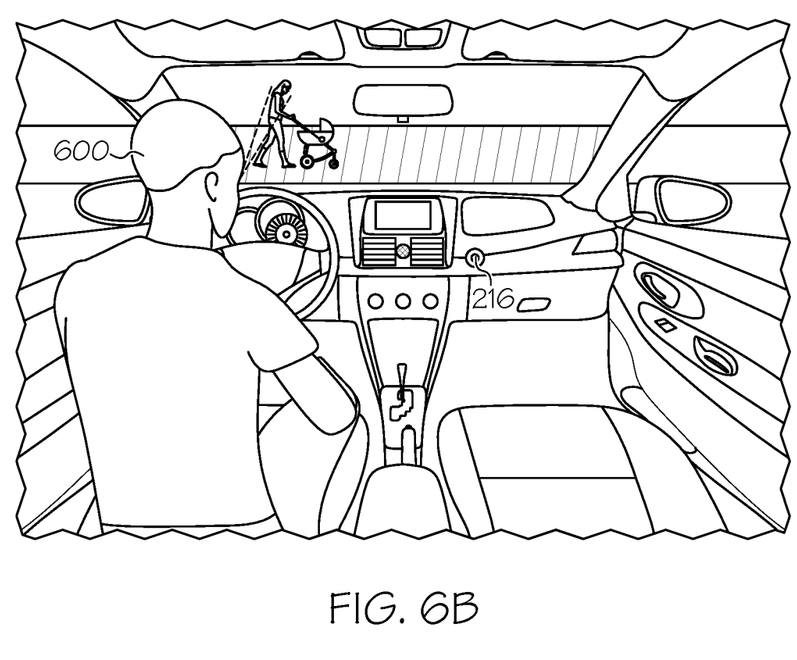

FIGS. 6A and 6B schematically depict an example operation of the vehicle system 200 that is configured to generate targeted warning that is output in association with a road agent (e.g., pedestrians, bicyclists, scooter operators, skateboarders, autonomous and non-autonomous vehicles, etc.) based on detecting the gaze of one or individuals within the vehicle 100, according to one or more embodiments described and illustrated herein. It is noted that the features depicted in FIGS. 6A and 6B will be discussed interchangeably. Specifically, the vehicle 100 is shown to be located at an intersection of a roadway at distance 408 away from the road agent 104. In some embodiments, an inward facing camera 216 may capture multiple images or a live video stream of a driver within the vehicle 100. Additionally, the one or more processors 202 may analyze these images or the live video stream to determine the direction of a gaze (or orientation of the eyes) of the driver 600 of the vehicle 100 relative to the road agent 104 at certain distance away from the vehicle 100. In a non-limiting example, one or more supervised machine learning techniques may be utilized by the one or more processors 202 to analyze the one or more images or live video stream of the driver 600 (captured by the inward facing camera 216) to determine precisely which areas in the exterior of the vehicle the driver 600 may be viewing. For example, the locations of focus of the driver's gaze may be predicted based on analyzing the orientation of the eyes of the driver 600. In a non-limiting example, the orientation of the eyes of the driver 600 may be analyzed in conjunction with the orientation of the head of the driver 600. In embodiments, if the eyes of the driver are detected as oriented in a certain direction (e.g., 10 degrees to the right of the steering wheel), the vehicle system 200 may determine that the driver 600 is looking in an area directly in front of the vehicle. Other such orientations are contemplated.

The one or more processors 202 may utilize the results of the analysis to instruct the outward facing camera 214 to capture one or more images of the road agent 104. For example, the images captured by the inward facing camera 216 may indicate that the road agent 104 is located at distance 408 away from the vehicle 100, in part because the gaze of the driver may indicate that the road agent 104 is within a field of view of the driver 600.

Thereafter, the one or more processors may analyze the one or more images captured by the outward facing camera 214 and determine that an orientation 602 of the head of the road agent 104 is pointing downwards and her body position appears to be facing forward, indicating that she is most likely unaware of the presence of the vehicle 100. The one or more processors may generate a targeted warning based on analyzing the position of the road agent (e.g., orientation 602 of the head of the road agent 104) at the distance 408. In some embodiments, the one or more processors 202 may instruct the headlights 102 of the vehicle 100 to output light that is displayed in a manner that is restricted to an example area 604. In embodiments, the headlights 102 may be collimated beam headlights (e.g., laser headlights) that are configured to output lights in a focused manner and with high intensity such that the outputted light is restricted to the example area 604. In particular, the outputted light may be a focused light beam of medium to high intensity that is displayed such in a largely spherical shape on the road agent 104 (e.g., pedestrians, bicyclists, scooter operators, skateboarders, autonomous and non-autonomous vehicles, etc.). Additionally, any permutation or combination of the light-based and audio-based targeted warnings described herein may be sequentially or simultaneously output by the vehicle system 200 described herein in order to notify the road agent 104 of the presence of the vehicle 100, without interfering or affecting other road agents (e.g., the road agent 106) who may located within a vicinity of the road agent 104.

It should now be understood that the embodiments described herein relate to a method of generate and outputting a targeted warning in association with a road agent. The method includes detecting, by a sensor operating in conjunction with a computing device of a vehicle, a road agent at a distance from the vehicle, analyzing, by the computing device of the vehicle, one or more characteristics of the road agent at the distance, generating, by the computing device, a targeted warning based on analyzing the one or more characteristics of the road agent at the distance, and outputting, by a component operating in conjunction with the computing device of the vehicle, the targeted warning in association with the road agent at the distance.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method comprising:
  detecting, by a sensor operating in conjunction with a computing device of a vehicle, a road agent at a distance from the vehicle;
  analyzing, by the computing device of the vehicle, one or more characteristics of the road agent at the distance;

generating, by the computing device, a targeted warning based on analyzing the one or more characteristics of the road agent at the distance, wherein the targeted warning is restricted to a perimeter that is specific to the road agent; and outputting, by a component operating in conjunction with the computing device of the vehicle, the targeted warning on at least one of eyes and ears of the road agent at the distance; and detecting, via an additional sensor, an orientation of eyes of a driver of the vehicle relative to the road agent at the distance.

2. The method of claim 1, wherein the sensor is a camera and the component operating in conjunction with the vehicle is at least one of headlights of the vehicle or a speaker of the vehicle.

3. The method of claim 1, wherein detecting the road agent at the distance includes capturing an image of the road agent at the distance from the vehicle.

4. The method of claim 1, wherein detecting the road agent at the distance includes capturing an image of the road agent at the distance from the vehicle.

5. The method of claim 1, wherein analyzing one or more characteristics of the road agent at the distance includes determining a posture of a head of the road agent at the distance from the vehicle.

6. The method of claim 1, wherein analyzing one or more characteristics of the road agent at the distance includes determining an orientation of a body of the road agent at the distance.

7. The method of claim 1, wherein outputting, the targeted warning on the road agent at the distance includes light displayed from headlights of the vehicle that is targeted to eyes of the road agent at the distance.

8. The method of claim 1, wherein outputting, the targeted warning on the road agent at the distance includes outputting an audio alarm targeted to ears of the road agent at the distance.

9. The method of claim 8, wherein a range of the audio alarm is associated with the perimeter around the road agent at the distance.

10. The method of claim 1, further comprising outputting, an additional targeted warning on the road agent at the different distance, wherein the additional targeted warning includes displaying light from headlights of the vehicle targeted to eyes of the road agent at the different distance.

11. The method of claim 1, outputting, an additional targeted warning on the road agent at a different distance, wherein the additional targeted warning includes outputting an additional audio alarm targeted to ears of the road agent at the different distance.

12. The method of claim 1, further comprising outputting, an additional targeted warning on the road agent at the different distance, wherein the additional targeted warning includes displaying light from headlights of the vehicle that is targeted to eyes of the road agent at the different distance.

13. A system for alerting a road agent, the system comprising:
a sensor of a vehicle;
a component of the vehicle;
a computing device of the vehicle, wherein the computing device is configured to:
detect, by the sensor operating in conjunction with the computing device of the vehicle, the road agent at a distance from the vehicle;
analyze, by the computing device of the vehicle, one or more characteristics of the road agent at the distance;
generate, by the computing device, a targeted warning based on analyzing the one or more characteristics of the road agent at the distance, wherein the targeted warning is restricted to a perimeter that is specific to the road agent;
output, by the component operating in conjunction with the computing device of the vehicle, the targeted warning on at least one of eyes and ears of the road agent at the distance; and
detecting, via an additional sensor, an orientation of eyes of a driver of the vehicle relative to the road agent at the distance.

14. The system of claim 13, wherein the computing device outputting the targeted warning on the road agent at the distance includes displaying light from headlights of the vehicle that is targeted to eyes of the road agent at the distance.

15. The system of claim 13, wherein the sensor is a camera and the component of the vehicle is at least one of headlights of the vehicle or a speaker of the vehicle.

16. A method comprising:
detecting, by a sensor operating in conjunction with a computing device of a vehicle, a road agent at a distance from the vehicle;
analyzing, by the computing device of the vehicle, one or more characteristics of the road agent at the distance;
outputting, by a component operating in conjunction with the computing device of the vehicle, a targeted warning on at least one of eyes and ears of the road agent at the distance, wherein the targeted warning does not interfere with an additional road agent located within a vicinity of the road agent; and
detecting, via another sensor, an orientation of eyes of a driver of the vehicle relative to the road agent at the distance.

17. The method of claim 1, wherein the targeted warning that is restricted to the perimeter that is specific to the road agent does not interfere with another road agent.

18. The method of claim 16, further comprising generating, by the computing device, the targeted warning based on analyzing the one or more characteristics of the road agent at the distance, the targeted warning is restricted to a perimeter that is specific to the road agent.

* * * * *